April 23, 1968
HUGH L. DRYDEN, DEPUTY
ADMINISTRATOR OF THE NATIONAL
AERONAUTICS AND SPACE
ADMINISTRATION
3,379,974
PARTICLE DETECTION APPARATUS INCLUDING A BALLISTIC PENDULUM
Filed Nov. 10, 1965
3 Sheets-Sheet 1
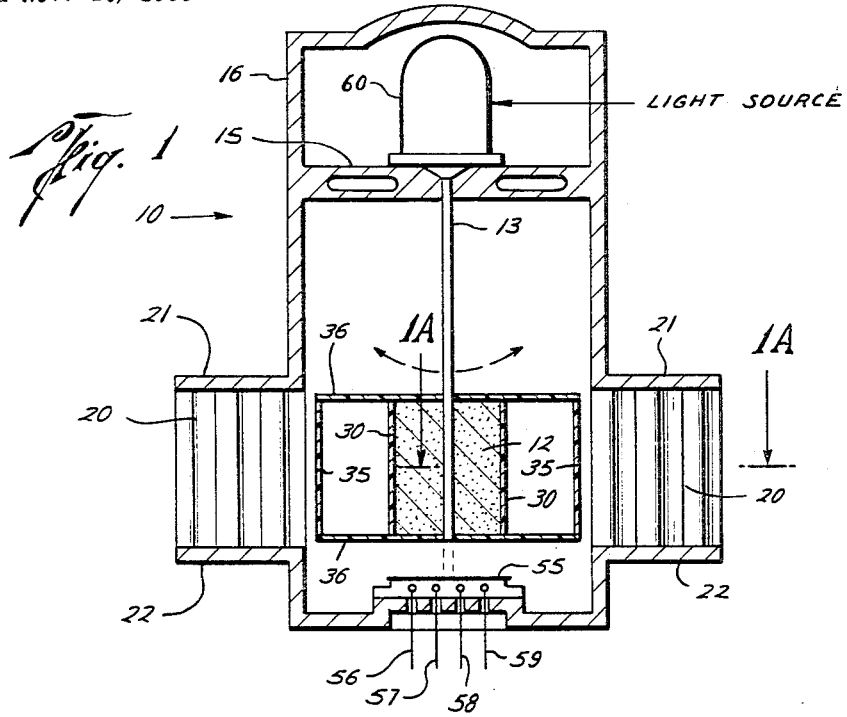
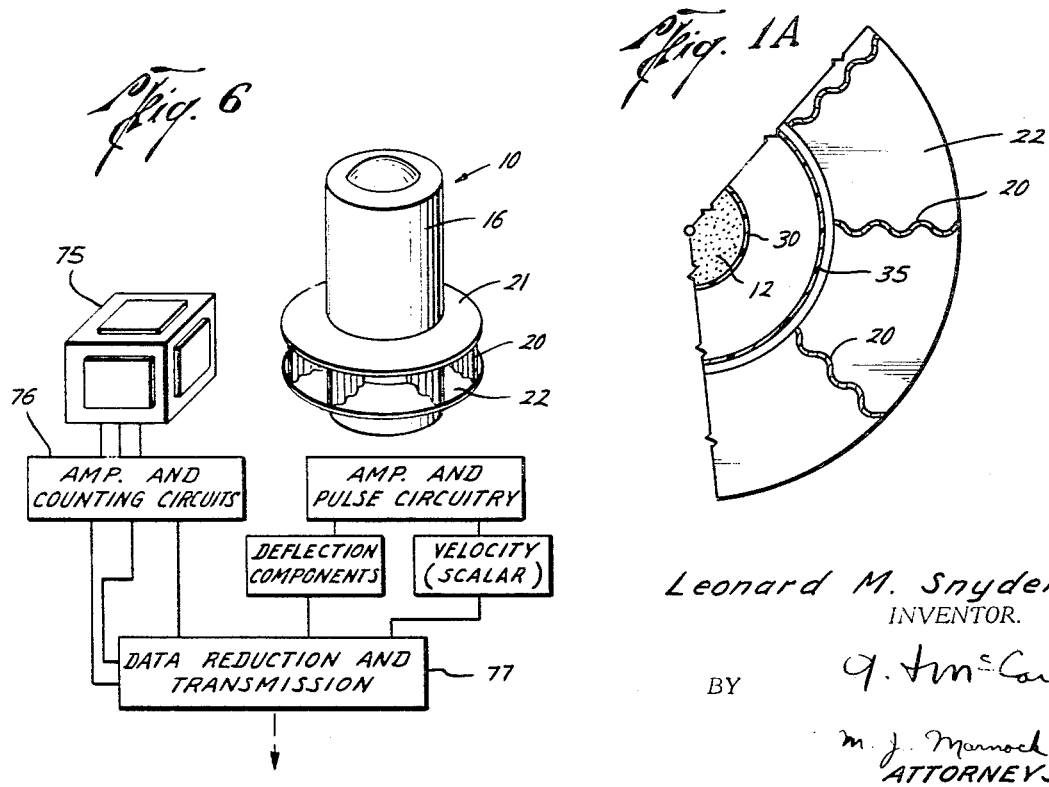
Leonard M. Snyder
INVENTOR.
BY
ATTORNEYS

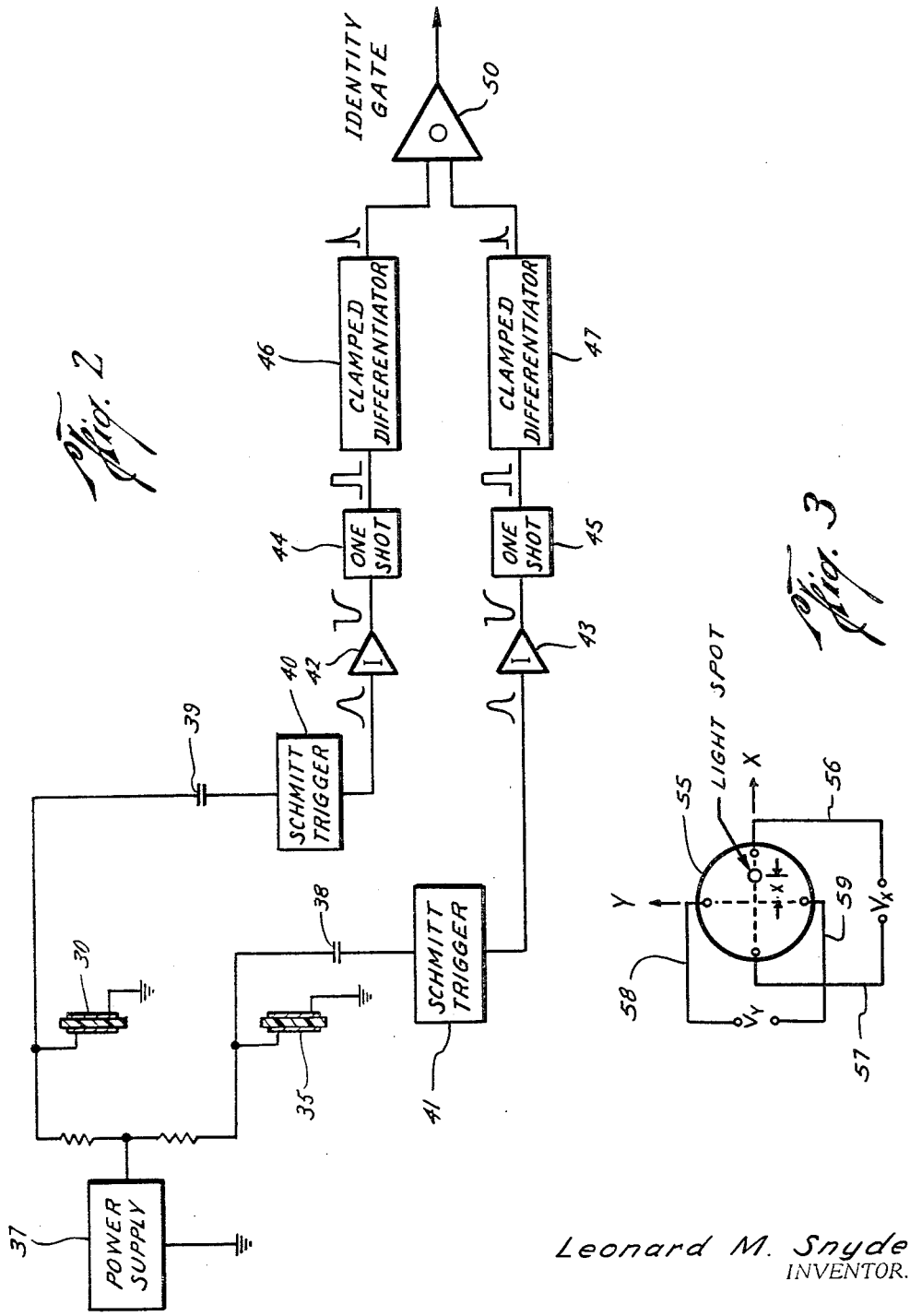

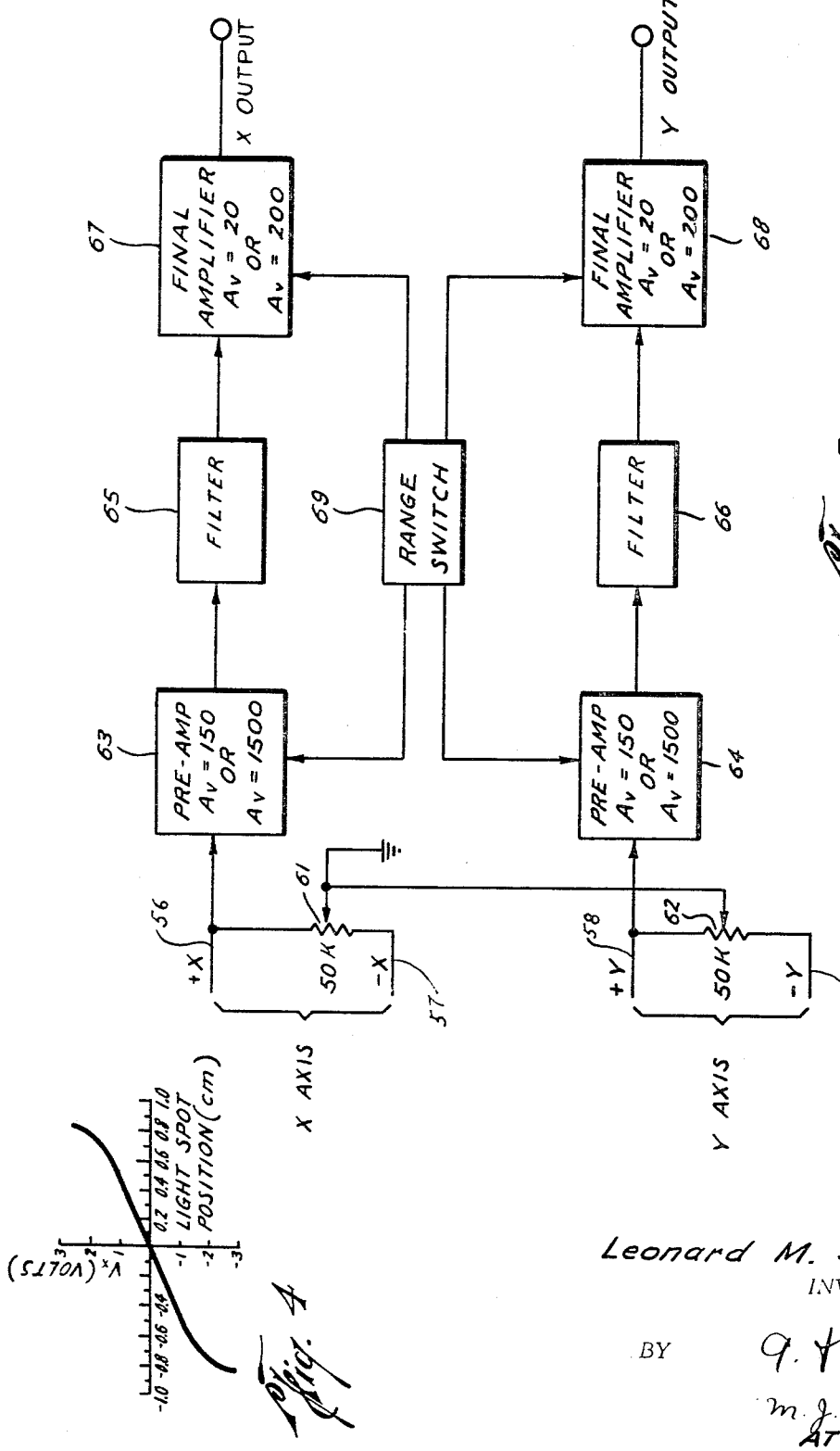

United States Patent Office 3,379,974
Patented Apr. 23, 1968

3,379,974
PARTICLE DETECTION APPARATUS INCLUDING A BALLISTIC PENDULUM
Hugh L. Dryden, Deputy Administrator of the National Aeronautics and Space Administration, with respect to an invention of Leonard M. Snyder, Pasadena, Calif.
Filed Nov. 10, 1965, Ser. No. 507,254
8 Claims. (Cl. 324—70)

The invention described herein was made in the performance of work under a NASA contract and is subject to the provisions of Section 305 of the National Aeronautics and Space Act of 1958, Public Law 85–568 (72 Stat. 435; USC 2457).

This invention relates to the detection of small particles and more particularly to detection apparatus for measuring the momentum and velocity of minute space particles.

Particle collision detecting devices have heretofore been devised for providing information regarding micrometeorites, such as their frequency of incidence, mass, velocity, and the like. However, the accuracy and reliability of these devices has always been subject to question. A particular failing of the prior art devices is their inability to compensate for the "rocket" effect which results when a minute hypervelocity particle explodes on impact, as often happens. Unless prevented, the "rocket" effect resulting from material being rocketed out out of the impact cavity completely masks the true momentum of the micrometeorite, and in consequence the results of conventional detection apparatus are subject to a wide margin of error. In addition, it has been difficult to analyze micrometeorites with a wide range of momenta in the zero gravity environment of space.

The momentum-velocity analyzer of this invention which has been devised to overcome attendant limitations of the prior art devices, is adapted to directly measure momentum and the scalar and vector components of the velocity of space particles from their inelastic collisions with a ballistic pendulum which is a classical device for the determination of projectile momentum. The conservation of momentum when a particle of mass $m$ collides inelastically with a pendulum of mass $M$ is given by $$MV = mv$$

where $V$ is the velocity of the pendulum after impact and $v$ is the velocity of the micrometeorite before impact. Since particle mass is very, very small compared to the mass $M$, this equation is substantially valid for collisions in which the particle is absorbed into the pendulum mass. To adapt the ballistic pendulum for use in a gravity-free environment, a spring-loaded pendulum is adopted such that the initial kinetic energy of the pendulum, after impact, is completely transferred to the spring at maximum deflection and $$\tfrac{1}{2}MV^2 = \tfrac{1}{2}kx^2$$

where $k$ is the spring constant, and $x$ is the total deflection of the pendulum. By solving the above equations simultaneously for the momentum $mv$ of the micrometeorite, the result is $$mv = x\sqrt{Mk}$$

which indicates that the momentum of the particle is directly proportional to the deflection of the pendulum and the constant of proportionality involves the spring constant and the mass of the pendulum, both of which can be accurately measured in the laboratory.

The pendulum in the instrument of this invention comprises a bob in the form of a disc of particle-absorbing material which is suspended at its center by a quartz filament with a known spring constant. The pendulum is enclosed within a housing having a window extending 360°, and for preventing angular motion of the pendulum the window is complemented by radial fins 20 which allow only those particles to enter the housing and strike the ballistic pendulum which are traveling substantially perpendicularly with respect to the axis of the particle absorber.

The instrument provides an indication of the velocity of a particle by determining the time of flight of the particle between two known points on the pendulum. The velocity determining means includes a thin-film capacitor which is attached in engagement with the periphery of the particle absorber and an outer thin-film capacitor, or apron, with similar capacitive characteristics, disposed in concentric relation therewith. Each capacitor is in the form of a sandwich with layers of metal coating both sides of a thin-film dielectric. The inner capacitor and the outer apron capacitor provide two concentric members with a radial distance therebetween which constitutes a transit interval from which time of flight and velocity measurements can be made. When a charge is placed on the concentric thin-film capacitors, a hypervelocity penetration of the capacitors by an impacting particle causes a voltage breakdown resulting in an electrical pulse of very short duration. The two sequentially produced pulses are used to trigger high-speed output circuits for determining the transit time, and hence the scalar velocity, of the particle.

The deflection of the pendulum in magnitude and direction is measured by a radiation tracking transducer which consists of a silicon wafer disc with leads attached 90° apart around its circumference. In addition to its function of supporting the absorber and providing the requisite elastic medium for the pendulum, the quartz filament transmits light from a light source to the tracking transducer, whereby a beam of light from the filament normally falls on the center of the disc during quiescent conditions. If the pendulum is deflected and the beam falls at a point other than the center of the disc, unequal currents in the leads are generated which are interpreted by a receiving instrument as position on an x-y grid for measuring pendulum deflection.

Since the momentum of an impacting particle is directly proportional to the pendulum deflection which is measured by the radiation tracking transducer, and is also a function of the pendulum mass and the spring constant which are known constants, the particle momentum is readily determinable, and appropriate amplifiers and discrimination circuits connected to the radiation tracking cell may be utilized to directly indicate the direction of the particle and particle momentum.

A significant feature of the analyzer of this invention is that the outer apron also serves to prevent erroneous readings caused by the "rocket" effect. If the hypervelocity particle should explode upon impact with the absorber, the material rocketed out of the cavity will strike the inner edge of the apron which counteracts jetting the pendulum forward, thus neutralizing the "rocket" effect on pendulum movement. In addition, any momentum which might be lost when the particle pierces the outer apron is transferred to the pendulum, whereby accuracy of the momentum determination is preserved.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a schematic sectional view of the micrometeorite momentum-velocity analyzer of this invention;

FIG. 1A is a sectional view of a part of the analyzer of this invention as taken along the line 1A—1A in FIG. 1 and looking in the direction of the arrows;

FIG. 2 is a schematic diagram of thin film detectors and associated circuitry for measuring particle velocity;

FIG. 3 is a schematic illustration showing the application in this invention of a radiation tracking transducer for measuring ballistic pendulum deflection;

FIG. 4 is a typical voltage response curve for the radiation tracking transducer shown in FIG. 3;

FIG. 5 is a schematic diagram of the electronics used in the analyzer of this invention for measuring pendulum deflection and particle momentum; and FIG. 6 is a schematic diagram showing incorporation of the momentum-velocity analyzer of this invention in a micrometeorite detector system.

Referring more particularly to the drawings, there is shown in FIG. 1 a momentum-velocity analyzer 10 which represents a preferred embodiment of this invention, particularly adapted for the detection and analysis of micrometeorites in the space environment. The analyzer 10 comprises a spring-loaded ballistic pendulum which is utilized for the determination of projectile momentum. The pendulum consists of a particle-absorbing mass in the form of a Styrofoam disc 12 suspended at its center by a quartz filament 13 with a small Hooke's constant. The quartz filament extends through a central bore in the disc and protrudes slightly below the lower surface of the disc. At its other end the filament extends through a bore in a support 15 which is mounted in the pendulum housing 16. The filament is secured to the disc and the support 15 by a suitable adhesive.

The housing 16 is fabricated of aluminum or other material which is suitable for protecting the instrument against micrometeorite damage and the launch environment. The housing is of generally cylindrical form of circular cross-section, and is provided with a window extending 360°. The window is complemented by a plurality of radial fins 20 which are mounted in the window and distributed circumferentially thereabout. The radial fins are secured at their upper and lower edges to annular flanges 21 and 22 which extend outwardly of the housing a distance such that only those particles which are traveling substantially radially and perpendicularly with respect to the axis of the pendulum particle-absorbing mass are allowed to enter the housing and strike the ballistic pendulum. The fins 20 are thin metal vanes provided with grooved or corrugated surfaces whereby any particles striking the fins will be caused to explode rather than deflect or ricochet into the pendulum housing.

It is to be noted that the dynamic range of the instrument depends on the spring constant of the quartz filament which, in addition to supporting the pendulum mass, also provides the requisite elastic medium for the pendulum. The spring constant is a function of the geometry of the spring which may suitably be in the form of either a smooth straight filament or a helix. As a modification of the instrument, however, the single quartz filament may be replaced by several finer fibers arranged symmetrically about the axis of the absorber.

To provide means for determination of the scalar component of particle velocity, a capacitive metallic foil 30 is attached in engagement with the periphery of the particle absorber and disposed in concentric relation to the foil 30 is an outer annular foil or apron 35 with similar capacitive characteristics. Each foil is fabricated in the form of a sandwich with layers of metal coating both sides of a Mylar film. The apron foil is supported by discs 36 of plastic or the like, which are disposed concentric to the Styrofoam particle absorber disc, and are attached on the opposite faces of the absorber. The apron is attached by a suitable adhesive to the peripheries of the discs and thereby defines a circular cylinder concentric to the axis of the absorber.

The inner metallic foil and the apron foil therefore constitute two concentric members with a radial distance therebetween of approximately 10 cm. which represents a transit interval from which time of flight for velocity measurements can be made. For this purpose a voltage is applied across the metal layers of each foil whereby the penetration of the foil by an impacting hypervelocity particle causes a short circuit and voltage breakdown resulting in a pulse of very short duration. The voltage pulses sequentially derived from these concentric members upon their penetration by an impacting particle provide the means for determining the transit time and therefore the scalar velocity of the particle. After an impact event, healing of the capacitors occurs by the electrical short melting and evaporating the metal foil so that succeeding penetrations may be detected.

The thin film capacitive detectors and associated pulse shaping circuitry for determining velocity are shown schematically in FIG. 2. The thin film capacitors are charged by a power supply 37. The pulses from these capacitors are each coupled through capacitors 38, 39, respectively, to a Schmitt trigger circuit 40, 41 the outputs of which are amplified by means of saturating inverters 42, 43 which also decrease the rise time. The outputs of the inverters are used to drive a pair of 50 microsecond multivibrators, 44, 45 which in turn are coupled to differentiating circuits 46, 47 respectively. The differentiating circuits differentiate and clamp the multivibrator pulses to suppress the negative spike. The resulting outputs are then applied to an identity gate 50 in the form of an inverted exclusive OR circuit. The identity gate allows only a single output and produces a negative output pulse if only one of its inputs is pulsed. However, if both inputs are pulsed simultaneously, the gate functions as an anticoincidence gate and no output pulse is produced.

The two pulses generated by the thin film capacitive detectors in the event of a micrometeoritic impact may be received in a suitable computer means for determining scalar velocity from the time of flight. If displayed on a cathode ray tube, for example, the time displaced pulses indicate time of flight or velocity. To aid in interpretation of this data, the two inverters may be made to produce a different amplitude pulse. In this manner it can be easily determined from the scape trace which of the two Mylar capacitors is responsible for a given pulse.

The deflection of the pendulum in magnitude and direction is measured by means of a radiation tracking transducer which is mounted below the pendulum and intercepts a beam of light emanating from the quartz pendulum support. The radiation tracking transducer is a silicon P-N junction such as the type XY20 radiation tracking transducer manufactured by Electro-Optical Systems, Inc., and comprises a silicon wafer disc 55 with leads 56–59 attached 90° apart around its circumference, as shown in FIG. 3. This transducer utilizes the lateral photo-currents flowing parallel to the junction instead of the transverse currents. The beam of light which emanates from the pendulum is derived from the quartz filament which, in addition to its function of supporting the Styrofoam absorber, transmits the light from a light source 60 to the tracking transducer. The light source is an incandescent lamp mounted atop the housing support 15 directly over the quartz filament.

The silicon wafer disc of the transducer is disposed directly beneath the pendulum in coaxial concentric relation with the Styrofoam disc, whereby during quiescent conditions when there is no pendulum deflection the beam of light from the filament falls directly on the center of the disc. However, in the event of a pendulum deflection by an impacting particle, the beam of light falls on the disc at a point other than at its center and unequal currents are generated from the leads 56–59 which are interpreted by a suitable receiving instrument (not shown) as a position on an X-Y grid and therefore are a measurement of pendulum deflection. A typical value for a pendulum deflection by micrometeoritic impact is in the order of .25 cm. A typical voltage response curve for light spot deflection is shown in FIG. 4.

A diagram of the electronics for determining pendulum deflection is shown in FIG. 4. The X axis leads 56, 57 from the transducer are connected by a resistor 61, and the Y axis leads from the transducer are connected by a resistor 62. The two resistors are adjustable to provide the transducer with a virtual ground. This enables the X and Y outputs to be referenced to the same signal common, eliminating the need for double ended inputs to the amplifiers and at the same time isolating the X and Y transducer channels to minimize cross talk. The two amplifying means used for the X and Y outputs are identical, and each comprise a pre-amplifier 63, 64 coupled through a narrow pass band filter 65, 66 whose center frequency is equal to the pendulum frequency, to a final stage amplifier 67, 68. A range switch 69 may be provided, if desired, to switch the pre-amplifier from a gain of 15 to 1,500, for example, and the final stage amplifier from a gain of 20 to 200, so that an over-all voltage gain range of 1,350, 13,500, or 135,000 could be obtained to accommodate different orders of particle momentum.

The output signals from the X-Y amplifiers are in the form of damped sinusoids with the initial polarity of the signal indicating whether the deflection is in the positive or negative direction. These signals, together with the velocity detector pulses are readily analyzable by either graphical methods or computer means for determining the momentum and velocity of an impacting micrometeorite. The direction of the pendulum deflection, and hence the vector direction of particle velocity, is represented by the arc tangent of the ratio of the X-component and Y-components of deflection. The square root of the sum of the squares of the X and Y component voltadges which represents a maximum voltage output, is representative of the maximum pendulum deflection. The momentum of the particle is the product of the maximum pendulum deflection and the known constant which involves the mass of the pendulum and the spring constant.

Power is supplied to the electronics via a battery pack or other suitable power supply such as a solar cell panel, which together with the associated circuitry is located externally of the instrument housing. The lead wires to the velocity detecting foils carried by the particle absorber are dropped from the housing support 15 to the disc atop the absorber in a manner to avoid interference with the pendulum deflection. This may be accomplished by coiling the leads in a loose loop.

The ballistic pendulum momentum-velocity analyzer of this invention is intended for use in a micrometeoritic detection system which would also provide information regarding micrometeorite flux density. A schematic diagram of the momentum-velocity analyzer of this invention as incorporated in such a detention system is illustrated in FIG. 5. Various types of flux density analyzers might be used, and in the diagram is shown as a piezoelectric type analyzer 75 which includes amplifiers and counting circuits 76 for counting the number of impacts. This information, together with the information obtained from the momentum-velocity analyzer of this invention, is fed to an appropriate data reduction and transmission means 77, whereby the information may be stored and transmitted at selected intervals.

Although the momentum-velocity analyzer which has been described is a preferred embodiment of the invention, a number of modifications in the apparatus could be made. For example, while thin film capacitors in the form of aluminized Mylar are used as the detecting means for determining time of flight, a different velocity detecting means utilizing a thin aluminum oxide film and adjacent charge collector plates might also be employed. In this method the plasma which is generated during a hypervelocity penetration of the film is collected by the plates and could be used to generate an electrical output signal. In addition, it would also be feasible to use a small light source mounted on the bottom of the Styrofoam absorber for producing the beam of light intercepted by the radiation tracking transducer.

It is to be noted that since successful operation of the pendulum momentum sensor depends on a perfectly inelastic collision between particle and absorber, the selection of an absorber material is most important. The Styrofoam which has been selected as the absorber material in the embodiment of the invention described herein is an open cavity plastic with a density of 0.06 gram/cc. which may be readily machined into any shape. The pore size of the material is approximately five mils, and the phenomenon of outgassing in a vacuum does not present a significant problem as would be characteristic of many other materials.

It should therefore be understood that the foregoing disclosure relates only to preferred embodiments of the invention and that it is intended to cover all changes and modifications of the examples of the invention herein chosen for the purposes of the disclosure and which do not constitute departure from the spirit and scope of the invention.

What is claimed and desired to be secured by Letters Patent is:

1. A micrometeorite detection system, said system comprising a ballistic pendulum;

a housing for enclosing and supporting said pendulum, said pendulum comprising a pendulous mass adapted to absorb impacting micrometeoritic particles by inelastic collision, and a spring means supporting said particle-absorbing pendulous mass within said housing and providing a restoring force for said pendulum;

means limiting entry into said housing to only those micrometeorites which are traveling substantially perpendicular with respect to the axis of the pendulum and are on a collision course with said particle-absorbing pendulous mass;

means for producing electrical signals representative of the direction and magnitude of pendulum deflection produced by a micrometeoritic impact with the particle-absorbing mass; and means for producing electrical signals indicative of the time of flight of a micrometeorite between two points on the pendulum prior to its impact with the particle-absorbing mass.

2. A micrometeorite detection system as described in claim 1, wherein said means for limiting entry of micrometeorities into said housing comprises a window opening in said housing extending 360°; and a plurality of metallic vanes mounted in said window and extending in radial directions from said pendulum axis, said metallic vanes having corrugated surfaces for preventing micrometeorites impacting with said vanes from deflecting into said housing.

3. A micrometeorite detection system as described in claim 1, wherein said means for producing electrical signals representative of the direction and magnitude of pendulum deflection comprises:

means producing a light beam directed coaxially with said pendulum axis whereby a deflection of the pendulum due to micrometeoritic impact with said pendulous mass produces a deflection of the light beam corresponding to deflection of the pendulum axis; and a radiation tracking transducer means for detecting deflection of said beam and generating electrical signals representative of the magnitude and direction of pendulum deflection.

4. A micrometeorite detection system as described in claim 1, wherein said means for producing electrical signals indicative of the time of flight of an impacting micrometeorite between two points on said pendulum comprises:

a pair of annular thin-film electrical capacitors mounted on said pendulous mass and concentrically disposed with respect to the axis of the pendulum, said thin-film capacitors being susceptible to penetration by a micrometeorite upon impact; and circuit means for producing an electrical pulse upon penetration of each said capacitor by an impacting micrometeorite, whereby the sequential pulses obtained upon sequential penetration of said capacitors by an impacting micrometeorite are indicative of the scalar velocity of the micrometeorite.

5. A micrometeorite detection system, said system comprising a ballistic pendulum;

a housing for enclosing and supporting said pendulum, said pendulum comprising a pendulous mass adapted to absorb impacting micrometeoritic particles by inelastic collision, and a spring means supporting said particle-absorbing pendulous mass within said housing and providing a restoring force for said pendulum;

means limiting entry into said housing to only those micrometeorites which are traveling substantially perpendicular with respect to the axis of the pendulum and are on a collision course with said particle-absorbing pendulous mass; and means for producing electrical signals indicative of the time of flight of a micrometeorite between two points on the pendulum prior to its impact with the particle-absorbing mass.

6. A micrometeorite detection system as described in claim 5, wherein said means for producing electrical signals indicative of the time of flight of an impacting micrometeorite between two points on said pendulum comprises:

a pair of annular thin film electrical capacitors mounted on said pendulous mass and concentrically disposed with respect to the axis of the pendulum, said thin film capacitors being susceptible to penetration by a micrometeorite upon impact; and circuit means for producing an electrical pulse upon penetration of each said capacitor by an impacting micrometeorite whereby the sequential pulses obtained upon sequential penetration of said capacitors by an impacting micrometeorite are indicative of the scalar velocity of the micrometeorite.

7. A detection system for the determination of momentum and velocity of small particles, said system comprising:

a ballistic pendulum;

a housing for enclosing and supporting said pendulum, said pendulum comprising a bob in the form of a pendulous mass of material adapted to absorb impacting particles by inelastic collision, and a spring means with a predetermined spring constant supporting and suspending said particle absorbing pendulous mass within said housing and providing a restoring force for said pendulum, said spring means being in the form of an optical fiber which is secured at one end to said housing and at its other end to said particle absorbing mass, said optical fiber extending through said particle absorbing mass which depends therefrom;

means limiting entry into said housing to only those particles which are traveling substantially perpendicular with respect to the axis of the pendulum and are on a collision course with said particle absorbing mass;

light source means adjacent said one end of the optical fiber for transmitting light rays from said source through said optical fiber to produce a light beam emanatig from said pendulous mass in a direction coaxial with said pendulum axis, whereby a deflection of the pendulum due to a particle impacting with said pendulous mass produces a deflection of the light beam corresponding to deflection of the pendulum axis;

a radiation tracking transducer means for detecting deflection of said beam and generating electrical signals representative of the magnitude and direction of pendulum deflection; and means for producing electrical signals indicative of the velocity of a particle between two points on the pendulum prior to its impact with the particle absorbing mass, whereby the momentum of the particle is determinable from the magnitude of pendulum deflection and the velocity of the particle.

8. A particle detection system as described in claim 7, wherein said particle-absorbing pendulous mass consists of Styrofoam material.

References Cited

UNITED STATES PATENTS

| | | | |
|---|---|---|---|
| 2,993,372 | 7/1961 | Bleakney | 73—167 |
| 3,222,596 | 12/1965 | Meyer | 324—70 |
| 3,296,526 | 1/1967 | Kinard | 324—70 |

RUDOLPH V. ROLINEC, *Primary Examiner.*

M. J. LYNCH, *Assistant Examiner.*